United States Patent Office 3,462,708
Patented Aug. 19, 1969

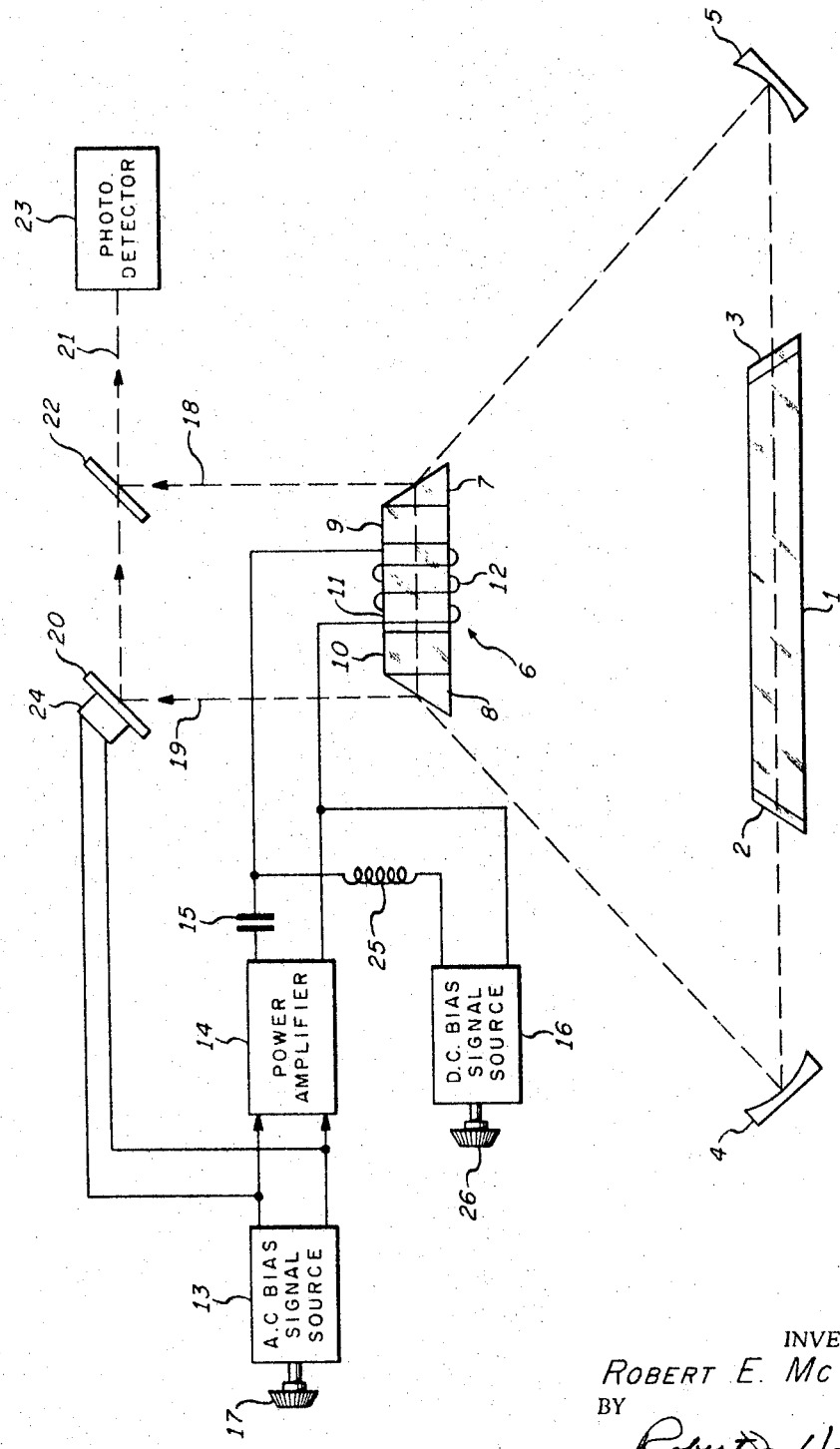

3,462,708
RING LASER HAVING A PIEZOELECTRIC REFLECTOR EXTERNAL TO THE CLOSED LOOP TO CANCEL A FREQUENCY MODULATION WITHIN THE LOOP
Robert E. McClure, Locust Valley, N.Y., assignor to Sperry Rand Corporation, a corporation of Delaware
Filed Nov. 29, 1966, Ser. No. 597,761
Int. Cl. H01s 3/08, 3/10
U.S. Cl. 331—94.5   8 Claims

ABSTRACT OF THE DISCLOSURE

A closed loop (triangular) resonant cavity laser equipped with a frequency bias cell sandwiched between a pair of prisms at one of the corners of the closed loop optical path. The frequency bias cell comprises a birefringent material which introduces a differential delay in the two counterrotating laser beams in accordance with the amplitude of an applied alternating control signal. The amplitude of the control signal is adjusted to a particular value to minimize mode locking of the two counterrotating beams.

---

The invention herein described was made in the course of or under a contract or subcontract thereunder, with the Department of the Air Force.

The present invention generally relates to ring laser rotation rate sensors and, more particularly, to such a laser wherein provision is made for frequency biasing the counterrotating light beams with an alternating signal of proper amplitude in order to minimize the frequency locking characteristic of the ring at low angular rotations.

As is well understood, each oscillatory mode of a so-called "ring" or closed loop resonant cavity laser comprises two beams of light which travel around the cavity in opposite directions. Ordinarily, and unless perturbed, the counterrotating beams form a degenerate set, each beam having exactly the same frequency. The degeneracy can be removed in a variety of ways, for example, by the rotation of the ring shaped cavity about an axis perpendicular to the plane of the cavity or by the use of a birefringent material positioned within the cavity. Accordingly, ring lasers conventionally are employed to sense angular rotation rates about an axis normal to the plane of the cavity. Such rotational rate is determined by measuring the frequency difference between the two counterrotating beams arising from the removal of degeneracy by ring rotation. The frequency difference is easily ascertained by extracting the counterrotating beams from the cavity, heterodyning the extracted beams in a photodetector cavity to produce a "beat" frequency signal and then measuring the frequency of the beat signal. It is also well known that no beat signal is produced, i.e., the counterrotating beams become frequency synchronized to each other, when the angular rotation of the ring laser is less than a certain finite threshold value peculiar to each laser. A reflecting or a scattering component placed in the optical path causes mutual coupling between the two counterrotating beams. The greater said coupling, the higher will be the aforementioned threshold value. Frequency synchronization (frequency locking) of the counterrotating beams destroys the ability of the ring laser to sense low angular rotations. This problem can be avoided, however, by introducing birefringent means into the ring cavity optical path which frequency biases the counterrotating beams so that a frequency difference (beat signal) exists above the threshold frequency at all times. It is only necessary that the frequency bias be great enough to ensure that the ring laser never operates in the frequency locking region of its characteristic for all contemplated values of angular rotations.

Frequency offsetting or bias can be achieved by the insertion of birefringent means within the optical path of the ring laser as disclosed in patent application S.N. 328,326, now U.S. Patent No. 3,382,758, filed Dec. 5, 1963, in the name of Chao C. Wang for "Rotation Rate and Rotation Direction Sensing Ring Laser" and assigned to the present assignee. It should be noted that the frequency offsetting thus achieved merely avoids the problem of frequency locking. It does not tackle the problem in the sense of actually reducing the forces which urge the two counterrotating beams to become frequency synchronized to each other at low angular rotations of the ring laser. It is desirable to reduce the frequency locking forces in order to minimize the frequency locking region at low angular rotations and also to increase the linear range of operation of the ring laser wherein the value of the beat frequency is linearly related to the value of rotation rate to be ascertained.

One object of the present invention is to provide means for reducing the frequency locking region of a ring laser at low angular rotations.

Another object is to provide in a ring laser means for opposing the frequency locking forces which act upon the counterrotating beams at low angular rotations.

A further object is to provide in a ring laser means for minimizing the frequency locking region at low angular rotations without the introduction of any structure within the ring laser optical path beyond that which is conventionally required.

These and other objects of the present invention, as will appear from a reading of the following specification, are accomplished by the provision of conventional frequency offsetting or biasing means within the optical path of a ring laser. In the preferred embodiment, the frequency offsetting means comprises a birefringent material sandwiched between a pair of prisms in the manner disclosed in patent application Ser. No. 563,428, filed July 7, 1966 in the name of Warren M. Macek for "Ring Laser Having Minimized Frequency Locking Characteristic" and assigned to the present assignee. The birefringent material introduces a delay into one of the counterrotating beams which is different from the delay introduced into the other counterrotating beam. The amount of the delay is determined by the value of a control signal which is applied to the birefringent material.

Unlike the case in the aforementioned Ser. No. 563,428, where the control signal is of fixed amplitude, the present invention provides for the cyclic variation in the amplitude of the control signal. It has been found that a cyclically varying (alternating) control signal reduces the frequency locking forces acting within the ring laser at low angular rotations and that said force can be reduced to a minimum when the amplitude of the alternating control signal is adjusted to one of a number of discrete values. The alternating control signal produces frequency modulation of each of the counterrotating beams within the ring laser. Each beam is modulated by the same amount but in an opposite sense, i.e., the frequency of one beam increases while the frequency of the other beam decreases and vice versa. For a given frequency value of the alternating control signal, a number of unique amplitudes exist each of which produces a frequency modulation index in the two beams equal to one-half the value of a respective root of the well known Bessel function which is descriptive of the relationship between the amplitude of the carrier component of a frequency modulated signal and the frequency modulation index. When the amplitude of the alternating control signal is adjusted to any one of said values at a given frequency, the tendency toward frequency locking at low angular rotations reduces toward zero. Undesirably, however, the amplitude of the beat frequency signal, which is the useful signal output from the ring laser, also reduces toward zero along with the desired reduction in the frequency locking force.

In accordance with the present invention, the beat frequency signal is recovered by the addition of simple optical modulating means external to the ring laser cavity. The modulating means is inserted in the path of one or both of the extracted beams prior to their application to the photodetector wherein the beat frequency signal is produced. The present invention contemplates the frequency modulation of either beam alone or of both beams together inside the ring cavity and the modulation of either beam alone or both beams together outside the ring laser cavity. It is not necessary that the same beam be modulated by the same amount inside and outside the ring cavity. It is only required that the relative frequency modulation imparted to both beams within the ring cavity be substantially equal in amount but opposite in sense to the relative frequency modulation imparted to both beams outside the ring cavity.

The term "relative frequency modulation" refers to the manner in which the frequency of one of the counterrotating beams differs from the frequency of the other as a function of time. Thus, the relative frequency modulation of the two beams quantitatively is equal to the frequency modulation of the beat frequency signal.

For a more complete understanding of the present invention, reference should be had to the following specification and to the sole figure which is a simplified schematic diagram of a typical ring laser embodiment of the present invention.

Referring to the sole figure, the ring laser comprises gas laser tube 1 having Brewster angle end windows 2 and 3 through which issue linearly polarized beams of light whose polarization is in the plane of the figure. Each of the beams is directed in a respective direction around the ring by corner mirrors 4 and 5 and corner composite structure 6. Composite structure 6 comprises Brewster angle prisms 7 and 8, quarter waveplates 9 and 10 and Faraday cell 11 which are fixed together by index-matched adhesive. The detailed operation of composite structure 6 is described in the aforementioned application Ser. No. 563,428. Briefly, Faraday cell 11 is magnetically biased by means of winding 12 to exhibit birefringence to circularly polarized light passing through the cell in opposite directions of propagation. The linearly polarized light issuing from gas laser tube 1 and propagating in a counterclockwise direction around the ring is converted by quarter waveplate 9 into circularly polarized light which is delayed in Faraday cell 11 in accordance with the value of the index of refraction to circularly polarized light propagating in the counterclockwise direction about the ring. Linearly polarized light issuing from gas laser tube 1 and propagating in a clockwise direction around the ring is converted by quarter waveplate 10 into circularly polarized light which is delayed in Faraday cell 11 in accordance with value of the index of refraction to circularly polarized light propagating in the clockwise direction about the ring. The birefringence exhibited by Faraday cell 11 introduces a phase delay in the counterclockwise propagating beam which is different from the phase delay introduced in the clockwise propagating beam. In effect, the length of the path traversed by one of the beams in completing a circuit of the ring cavity is different from the length of the path traversed by the other beam in completing the same circuit. The result is that the frequencies of the two beams are offset, the frequency of the beam encountering the shorter path being higher than the frequency of the beam encountering the longer path.

The value of the birefringence introduced by Faraday cell 11 is determined by the amplitude of the signal applied to winding 12. In accordance with the present invention, said value is cyclically varied by the application of an alternating signal generated by a source 13 and coupled to winding 12 via power amplifier 14 and capacitor 15.

Neglecting for the moment the presence and purpose of D.C. biasing signal source 16, source 13 provides an alternating signal of convenient frequency substantially higher than the minimum beat signal frequency ordinarily obtainable from the ring laser when zero birefringence is presented by cell 11. For example, in one typical ring laser design with no birefringence within the optical path, the minimum beat signal frequency is approximately 1 kHz. A frequency of 5 kHz. is suitable in that case for source 13. The variation in the index of refraction encountered by the two counterrotating beams passing through Faraday cell 11 in response to the application of the alternating control signal causes the beams to become frequency modulated in opposite senses at the frequency of the control signal. The maximum frequency deviation of the frequency modulated signals depends upon the amplitude of the control signal in accordance with well known frequency modulation theory.

It has been found that when the amplitude of the control signal is adjusted to produce frequency modulation index values in the two counterrotating beams whose sum is substantially equal to any one of a number of certain amounts, the frequency locking effect at low angular rotations is substantially reduced in the ring laser. The certain amounts referred to are those frequency modulation index values at which the energy in the carrier term of a frequency modulated signal reduces to zero. It is preferable that the first such frequency modulation index value (2.4) be selected for operation. Accordingly, the amplitude of the 5 kHz. signal provided by source 13 in the foregoing example preferably is adjusted to that value which produces a difference of 2.4 between the frequency modulation indexes of two counterrotating beams propagating through Faraday cell 11. Assuming that cell 11 equally and oppositely frequency modulates each beam, the frequency modulation index of each beam is 1.2. It will be understood by those skilled in the art that the frequency of source 13 may be adjusted to any other convenient value with appropriate adjustment of the amplitude of the modulating signal (by means of amplitude control knob 17) so as to restore the total frequency modulation index value to 2.4 at the selected frequency.

One undesired consequence of achieving a reduction in the frequency locking effect is the loss of the beat note upon heterodyning the two frequency modulated beams in the conventional manner. The undesired effect is overcome by the use of optical modulating means in the path of either or both of the beams after extraction from the ring laser and prior to the application of the extracted beams to the photodetector which produces the beat note.

As explained in the above-cited application Ser. No. 563,428, the two counterrotating beams may be extracted simply by rotating the composite structure 6 so that the linearly polarized counterrotating beams impinge upon prisms 7 and 8 slightly out of the plane of incidence of the prism-air interfaces whereby a small amount of specular reflection takes place at each of the prism-air interfaces. The counterclockwise rotating beam is partially reflected by prism 7 along path 18. The clockwise propagating beam is partially reflected by prism 8 along path 19 and is again reflected by mirror 20 along path 21 after passing through beam splitter 22. The beam propagating along path 18 is reflected by beam splitter 22 along path 21 whereby the counterrotating beams extracted from the ring cavity become collinear along path 21 and are jointly applied to photodetector 23.

Attached to the rear surface of mirror 20 is a piezoelectric ceramic material 24 which is excited by the alternating signal from source 13. The mechanical constriction of ceramic 24 induced by the application by the signal from source 13 causes mirror 20 to move in synchronism therewith to cyclically lengthen and shorten the optical path traversed by the clockwise propagating beam after its extraction from the ring laser and before its application to the photodetector 23. The path length flunctuations frequency modulate said extracted beam is synchronism with the frequency modulation of the two counterrotating beams within the ring laser cavity. The amplitude and phase of the signal applied to material 24 are adjusted to produce frequency modulation of the extracted clockwise propagating beam equal but opposite in sense to the total magnitude of the frequency modulation imparted to the two beams within the ring cavity.

In order to understand the operation of the present invention, it is helpful to consider the instantaneous difference between the frequencies of the two frequency modulated signals within the ring cavity, i.e., the manner in which the beat frequency signal varies as a function of time. It will be noted that the beat frequency signal itself is a frequency modulated signal having a frequency modulation index equal to the difference between the frequency modulation indexes of the two beams within the ring cavity. For example, if the beams are frequency modulated in the same sense to respective values of 6.4 and 4, the frequency modulation index of the beat frequency signal would be 2.4. The same result is achieved in the disclosed embodiment where each beam is equally but oppositely frequency modulated with an index value of 1.2. The additional frequency modulation introduced by the action of material 24 and mirror 20 effectively cancels the frequency modulation of the beat frequency signal. In other words, the relative frequency modulation of the two beams inside the ring cavity is cancelled whereby the only frequency difference between the two external beams propagating along path 21 is due to the rotation of the ring laser about an axis perpendicular to the plane of the ring. The residual frequency difference, if any, is manifested by a beat note at the output of photodetector 23.

It should be noted that in the event that the signal applied to material 24 is of incorrect phase and amplitude to completely cancel the relative frequency modulation between the two internal cavity beams, the frequency locking force at low angular rotations nevertheless is reduced within the ring but the magnitude of the beat note produced by photodetector 23 is less than a maximum value. If the difference between the frequency modulation indexes of the two internal cavity beams is other than one of the roots of the Bessel function previously described, the frequency locking force at low angular rotations is greater than its minimum value but still less than it would be in the absence of any frequency modulation of said two beams.

When the difference between the frequency modulation indexes of the two internal cavity beams is equal to one of the roots of the Bessel function, the frequency locking force at low angular rotations is reduced to a minimum within the laser cavity. In practice, the minimum force is a finite residual amount greater than zero. The result is that the beat note frequency does not linearly fall to zero as the ring rotation rate reduces to zero but instead abruptly falls to zero upon reaching a certain threshold value substantially less than the threshold value obtaining in prior art ring lasers. The residual frequency locking effect can be avoided by superimposing a direct signal component upon the alternating control signal applied to Faraday cell 11 in the manner described in the aforementioned application S.N. 328,326. The direct signal component is provided by source 16 and is applied to cell 11 via choke 25. The amplitude of the direct signal component is adjusted by means of control knob 26 to a value producing a fixed frequency offset (in the absence of ring rotation) between the two internal cavity beams just exceeding the residual beat note threshold.

I claim:
1. A ring laser comprising
   means for generating two counterrotating beams of light about a closed loop optical path,
   a source of alternating control signal,
   first means coupled to said source and inserted in said path for frequency modulating at least one of said counterrotating beams in response to said control signal whereby said first means introduces relative frequency modulation between said beams,
   said laser being adapted to transmit said counterrotating beams onto respective paths external to said closed loop optical path, and
   second means coupled to said source and inserted in at least one of said external paths for modulating at least one of said beams propagating thereon so as to substantially cancel said relative frequency modulation between said beams introduced by said first means.

2. The ring laser defined in claim 1 wherein said control signal has a frequency substantially higher than the minimum beat signal frequency obtainable from said laser in the absence of said first means.

3. The ring laser defined in claim 1 wherein said control signal has a frequency and an amplitude such that the difference between the frequency modulation indices of said beams propagating on said closed loop optical path is substantialy equal to one of the roots of the Bessel function describing the relationship between the amplitudes of the carrier component and the frequency modulation index values of a frequency modulated signal.

4. The ring laser defined in claim 3 wherein said difference is 2.4.

5. The ring laser defined in claim 1 wherein said first means frequency modulates both said beams propagating on said closed loop optical path.

6. The ring laser defined in claim 1 wherein said second means is inserted in only one of said external paths.

7. The ring laser defined in claim 1 wherein said first means frequency modulates both said beams propagating on said closed loop optical path and said second means is inserted in only one of said external paths.

8. The ring laser defined in claim 1 and further including
   a source of direct current signal, and
   means for applying said direct current signal to said first means.

References Cited
UNITED STATES PATENTS 3,339,073    8/1967    Hunter.
3,411,849    11/1968    Arnowitz.

RONALD L. WIBERT, Primary Examiner

E. BAUER, Assistant Examiner

U.S. Cl. X.R.
323—7.51; 356—106